(12) United States Patent
Huang et al.

(10) Patent No.: US 11,639,439 B2
(45) Date of Patent: May 2, 2023

(54) THERMOSETTING RESIN COMPOSITION AND PREPREG

(71) Applicant: Prior Company Limited, Taipei (TW)

(72) Inventors: Yu Lin Huang, New Taipei (TW); I-Ling Chen, New Taipei (TW); Cheng-Hsin Tsai, Taipei (TW)

(73) Assignee: Prior Company Limited, Taipei (TW)

( * ) Notice: Subject to any disclaimer, the term of this patent is extended or adjusted under 35 U.S.C. 154(b) by 121 days.

(21) Appl. No.: 17/411,065

(22) Filed: Aug. 25, 2021

(65) Prior Publication Data

US 2022/0411628 A1  Dec. 29, 2022

(30) Foreign Application Priority Data

Jun. 24, 2021  (TW) .................. 110123037

(51) Int. Cl.
  *C08L 63/04* (2006.01)
  *C08J 5/24* (2006.01)
  *C08L 79/08* (2006.01)
  *C08G 64/12* (2006.01)
  *C08K 5/13* (2006.01)

(52) U.S. Cl.
  CPC .............. *C08L 63/04* (2013.01); *C08G 64/12* (2013.01); *C08J 5/24* (2013.01); *C08K 5/13* (2013.01); *C08L 79/08* (2013.01); *C08L 2201/08* (2013.01); *C08L 2312/08* (2013.01)

(58) Field of Classification Search
  CPC .................... C08L 79/08; C08G 64/12
  See application file for complete search history.

(56) References Cited

U.S. PATENT DOCUMENTS

| | | | |
|---|---|---|---|
| 10,294,341 B2 | 5/2019 | Moon et al. | |
| 2014/0023839 A1 | 1/2014 | Wang et al. | |

FOREIGN PATENT DOCUMENTS

| | | |
|---|---|---|
| CN | 101508844 | 8/2009 |
| CN | 101824148 | 9/2010 |
| CN | 102115600 | 7/2011 |
| CN | 102702482 | 10/2012 |
| CN | 102775605 | 11/2012 |
| CN | 103756315 | 4/2014 |
| CN | 108250443 | 7/2018 |
| CN | 109180947 | 1/2019 |
| CN | 110099975 | 8/2019 |
| CN | 111763323 | 10/2020 |
| CN | 112409592 | 2/2021 |
| TW | I700320 | 8/2020 |
| TW | I717814 | 2/2021 |
| WO | 2018124164 | 7/2018 |

OTHER PUBLICATIONS

"Office Action of Taiwan Counterpart Application", dated Jul. 7, 2022, p. 1-p. 5.
"International Search Report (Form PCT/ISA/210) of PCT/CN2021/102151," dated Feb. 24, 2022, pp. 1-5.
"Written Opinion of the International Searching Authority (Form PCT/ISA/237) of PCT/CN2021/102151," dated Feb. 24, 2022, pp. 1-3.

*Primary Examiner* — Wenwen Cai
(74) *Attorney, Agent, or Firm* — JCIPRNET

(57) ABSTRACT

A thermosetting resin composition and a prepreg are provided. The thermosetting resin composition includes a maleimide resin, a cyanate ester resin, and a crosslinking agent. The crosslinking agent is a silane-modified diallyl bisphenol compound whose structure is represented by Formula (1):

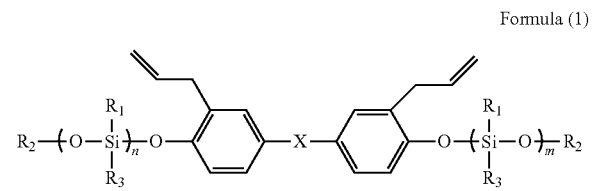

Formula (1)

in Formula (1), X is a linear or branched C1 to C6 alkyl, cycloalkyl, or sulfonyl group, R1 is a linear or branched C1 to C6 alkyl or aryl group, R2 is a C1 to C6 alkyl group, R3 is a functional group with a crosslinkable double bond, and n+m is a positive integer from 1 to 8.

14 Claims, No Drawings

THERMOSETTING RESIN COMPOSITION AND PREPREG

CROSS-REFERENCE TO RELATED APPLICATION

This application claims the priority benefit of Taiwan application serial no. 110123037, filed on Jun. 24, 2021. The entirety of the above-mentioned patent application is hereby incorporated by reference herein and made a part of this specification.

BACKGROUND

Technical Field

The disclosure relates to a resin composition and a prepreg, and particularly relates to a thermosetting resin composition and a prepreg.

Description of Related Art

In recent years, with the rapid development of communication technology, the demand for lightweight and high-density electronic products has increased day by day. The power consumption of the electronic product during the usage process generates a large amount of heat energy, which causes the temperature of the electronic product to rise, and constantly thermally expand and contract, such that the base material is easily damaged. Therefore, the dimensional stability of the electronic product is becoming more stringent. For the optimization of the dimensional stability, a conventional measure is to increase the content of the filler, but such method greatly increases the viscosity of the glue, which causes increased construction difficulty and poor appearance of the finished product. Another method is to increase the resin crosslinking density, which can increase the dimensional stability while increasing the heat resistance.

Based on the above, developing a thermosetting resin composition to achieve excellent dimensional stability, high glass transition temperature (Tg), and high heat resistance, and that is applicable to a copper foil substrate and a printed circuit board is a target of development for persons skilled in the art.

SUMMARY

The disclosure provides a thermosetting resin composition with a crosslinking agent to achieve excellent dimensional stability, high glass transition temperature (Tg), and high heat resistance, and that is applicable to a copper foil substrate and a printed circuit board.

A thermosetting resin composition of the disclosure includes a maleimide resin, a cyanate ester resin, and a crosslinking agent. The crosslinking agent is a silane-modified diallyl bisphenol compound whose structure is represented by Formula (1):

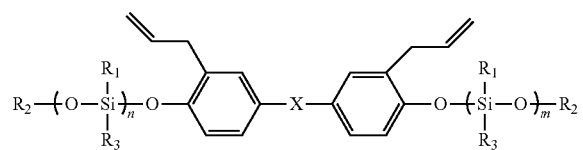

Formula 1

In Formula (1), X is a linear or branched C1 to C6 alkyl, cycloalkyl, or sulfonyl group, R1 is a linear or branched C1 to C6 alkyl or aryl group, R2 is a C1 to C6 alkyl group, R3 is a functional group with a crosslinkable double bond, and n+m is a positive integer from 1 to 8.

In an embodiment of the disclosure, the functional group with the crosslinkable double bond includes allyl, vinyl, acrylate, or methacrylate.

In an embodiment of the disclosure, n+m is 2 or 3.

In an embodiment of the disclosure, based on a content of the maleimide resin being 100 phr, a content of the cyanate ester resin is 30 phr to 210 phr and a content of the crosslinking agent is 15 phr to 150 phr.

In an embodiment of the disclosure, an equivalent ratio of reactive groups of the maleimide resin to the cyanate ester resin is 1:1 to 3:1.

In an embodiment of the disclosure, the cyanate ester resin includes a bisphenol A type cyanate ester resin, a dicyclopentadiene (DCPD) type cyanate ester resin, a bisphenol F type cyanate ester resin, a novolac cyanate ester resin, or a combination thereof.

In an embodiment of the disclosure, the maleimide resin includes 4,4'-diphenylmethane bismaleimide, phenylmethane maleimide oligomer, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl)hexane, or a combination thereof.

A prepreg of the disclosure is made of the thermosetting resin composition, and is made by impregnating or coating a base material with the thermosetting resin composition, and drying the impregnated or coated base material.

Based on the above, the thermosetting resin composition of the disclosure contains the silane-modified diallyl bisphenol compound as the crosslinking agent. Therefore, by increasing the resin crosslinking density, the thermosetting resin composition can achieve excellent dimensional stability, high glass transition temperature (Tg), and high heat resistance, and is applicable to a copper foil substrate and a printed circuit board.

DETAILED DESCRIPTION OF DISCLOSED EMBODIMENTS

Hereinafter, embodiments of the disclosure will be described in detail. However, these embodiments are illustrative, and the disclosure is not limited thereto.

In the disclosure, a range represented by "a value to another value" is a general way of expression to avoid listing all values in the range one by one in the specification. Therefore, the recitation of a specific numerical range covers any value in the numerical range and a smaller numerical range is defined by any value in the numerical range, which is the same as writing the arbitrary value and the smaller value range in the description of the specification.

The disclosure provides a thermosetting resin composition, which includes a maleimide resin, a cyanate ester resin, a crosslinking agent, a filler, a catalyst, and a solvent. Hereinafter, the various constituents will be described in detail.

<Maleimide Resin>

The maleimide resin of the disclosure may include 4,4'-diphenylmethane bismaleimide, phenylmethane maleimide oligomer, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl)hexane, or a combination thereof.

<Cyanate Ester Resin>

The cyanate ester resin of the disclosure may include a bisphenol A type cyanate ester resin, a dicyclopentadiene (DCPD) type cyanate ester resin, a bisphenol F type cyanate ester resin, a novolac cyanate ester resin, or a combination thereof. In the embodiment, an equivalent ratio of reactive groups of the maleimide resin to the cyanate ester resin is about 1:1 to 3:1. Based on the content of the maleimide resin being 100 phr, the content of the cyanate ester resin is, for example, 30 phr to 210 phr.

<Crosslinking Agent>

The crosslinking agent of the disclosure is a silane-modified diallyl bisphenol compound whose structure is represented by Formula (1):

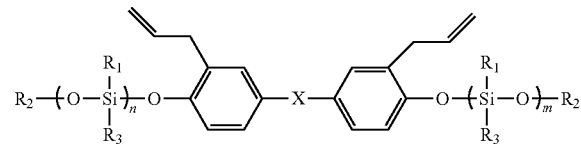

Formula 1)

In Formula (1), X is a linear or branched C1 to C6 alkyl, cycloalkyl, or sulfonyl group, R1 is a linear or branched C1 to C6 alkyl or aryl group, R2 is a C1 to C6 alkyl group, R3 is a functional group with a crosslinkable double bond, n+m is a positive integer from 1 to 8, and n+m is preferably 2 or 3.

Based on the content of the maleimide resin being 100 phr, the content of the crosslinking agent is, for example, 15 phr to 150 phr.

In more detail, in Formula (1), R3 is the functional group with the crosslinkable double bond. The functional group with the crosslinkable double bond may include allyl, vinyl, acrylate, or methacrylate, but the disclosure is not limited thereto. In addition, it must be noted that in Formula (1), R3 may or may not contain an oxygen atom. If R3 contains an oxygen atom, for example, an oxygen atom may be attached first, and then the functional group with the crosslinkable double bond may be attached.

<Filler>

The filler of the disclosure may include silicon dioxide, aluminum oxide, magnesium oxide, magnesium hydroxide, calcium carbonate, talc, clay, aluminum nitride, boron nitride, aluminum hydroxide, aluminum silicon carbide, silicon carbide, sodium carbonate, titanium dioxide, zinc oxide, zirconia, quartz, diamond, diamond-like, graphite, calcined kaolin, halloysite, mica, hydrotalcite, hollow silica, polytetrafluoroethylene (PTFE) powder, glass bead, nano-carbon tube, nano-grade inorganic powder, or a combination thereof, and preferably vinyl-modified silica. Based on the content of the maleimide resin being 100 phr, the content of the filler is, for example, 150 phr to 400 phr.

<Catalyst>

The type of the catalyst is not particularly limited, as long as the catalyst can promote the reaction of a functional group and lower the curing reaction temperature of a resin composition. Specifically, the catalyst may include dibenzyl peroxide, dicumyl peroxide, 2,5-dimethyl-2,5-bis(tert-butylperoxy)hexane, 2,5-dimethyl-2,5-bis(tert-butylperoxy)-3-hexyne, di-tert-butyl peroxide, bis(tert-butylperoxy-isopropyl)benzene, bis(tert-butylperoxy)phthalate, bis(tert-butylperoxy)isophthalate, tert-butyl peroxybenzoate, 2,2-bis(tert-butylperoxy)butane, 2,2-bis(tert-butylperoxy)octane, 2,5-dimethyl-2,5-bis(benzylperoxy)hexane, laurel peroxide, tert-hexyl peroxypivalate, bisbutylperoxycumene, bis(4-tert-butylcyclohexyl)peroxydicarbonate, or a combination of at least two thereof. Based on the content of the maleimide resin being 100 phr, the content of the catalyst is, for example, 2 phr to 6 phr.

<Solvent>

The type of the solvent is not particularly limited, as long as the solvent can enable the viscosity of a resin composition to be moderate, and is convenient for operation and curing. More specifically, the solvent may be dimethylacetamide, but the disclosure is not limited thereto.

The disclosure also provides a prepreg made of the thermosetting resin composition, and is made by impregnating or coating a base material with the thermosetting resin composition, and drying the impregnated or coated base material. In more detail, the base material may include a glass fiber reinforcement material (glass fiber cloth or non-woven cloth, glass paper, glass mat, etc.), kraft paper, linter paper, natural fiber cloth, organic fiber cloth, liquid crystal polymer fiber mat, etc. In the embodiment, for example, 2116 glass fiber cloth may be used as the reinforcement material (the base material), and is heated and dried at a temperature of 130° C. to 200° C. for 2 minutes to 10 minutes, thereby obtaining a semi-cured prepreg sheet. Several semi-cured prepreg sheets are stacked in a hot press for high-temperature curing. The curing conditions are, for example, curing at a temperature of 210° C. to 280° C. for 1 hour to 4 hours.

Hereinafter, the thermosetting resin composition proposed by the disclosure will be explained in detail through experimental examples. However, the following experimental examples are not intended to limit the disclosure.

EXPERIMENTAL EXAMPLES

In order to prove that the thermosetting resin composition proposed by the disclosure has excellent thermal properties and dimensional stability, experimental examples are specially provided as follows.

According to the composition ratios listed in Table 1 below, resin compositions of Example 1 to Example 5 and Comparative Example 1 to Comparative Example 5 were prepared. 2116 glass fiber cloth was used as a base material. The base material was impregnated or coated with the resin composition, and heated and dried at a temperature of 130° C. to 200° C. for 2 minutes to 10 minutes, thereby obtaining a semi-cured prepreg sheet. Several semi-cured prepreg sheets were stacked in a hot press for high-temperature curing. The curing conditions are, for example, curing at a temperature of 210° C. to 280° C. for 1 hour to 4 hours. After that, various properties of the test pieces were tested, and the test results are listed in Table 1 below.

In Table 1 below, the cyanate ester resin is a bisphenol A type cyanate ester resin, the maleimide resin is 3,3'-dimethyl-5,5'-diethyl-4,4'-diphenylmethane bismaleimide, the filler is silica, the catalyst is dicumyl peroxide, the solvent is dimethylacetamide, and the crosslinking agent is the silane-modified diallyl bisphenol compound represented by Formula (1).

TABLE 1

| | Example 1 | Example 2 | Example 3 | Example 4 | Example 5 | Comparative example 1 | Comparative example 2 | Comparative example 3 | Comparative example 4 | Comparative example 5 |
|---|---|---|---|---|---|---|---|---|---|---|
| Maleimide resin | 100 | 100 | 100 | 100 | 100 | 100 | 100 | 100 | 100 | 100 |
| Cyanate ester resin | 57 | 125 | 38 | 76 | 208 | 114 | 0 | 23 | 275 | 251 |
| Crosslinking agent | 26 | 127 | 35 | 18 | 29 | 0 | 52 | 21 | 57 | 190 |
| Filler | 185 | 360 | 176 | 197 | 345 | 215 | 158 | 149 | 440 | 550 |
| Catalyst | 2 | 4 | 2 | 2 | 2 | 2 | 2 | 2 | 5 | 6 |
| Solvent | Moderate | Moderate | Moderate | Moderate | Moderate | Moderate | Moderate | Moderate | Moderate | Moderate |
| Tg (DMA, °C.) | 210 | 206 | 203 | 206 | 220 | 196 | 201 | 193 | 242 | 194 |
| Td (5 wt % loss, °C.) | 474 | 453 | 476 | 447 | 423 | 420 | 489 | 496 | 435 | 431 |
| CTE (Alpha 1, ppm/°C.) | 22 | 11 | 23 | 9.7 | 11 | −55 | 32 | −19 | 14 | −28 |
| Peel strength (lb/in) | 2.45 | 2.37 | 1.82 | 2.15 | 1.94 | 1.73 | 0.98 | 1.97 | 2.81 | 2.72 |
| Solder dip test | OK | OK | OK | OK | OK | NG | OK | OK | NG | OK |
| Dk (10 GHz) | 4.10 | 4.23 | 4.32 | 4.19 | 4.07 | 3.75 | 4.14 | 4.11 | 4.19 | 4.20 |
| Df (10 GHz) | 0.0064 | 0.0076 | 0.0070 | 0.0071 | 0.0073 | 0.0059 | 0.0075 | 0.0069 | 0.0073 | 0.0077 |

(Unit: phr)

As shown in Table 1, Example 1 to Example 5 show that when the maleimide resin, the cyanate ester resin, and the crosslinking agent in the thermosetting resin composition meet the content ranges proposed by the disclosure (based on the content of the maleimide resin being 100 phr, the content of the cyanate ester resin is 30 phr to 210 phr and the content of the crosslinking agent is 15 phr to 150 phr), the cured resin composition has excellent thermal properties and dimensional stability. In contrast, Comparative Example 1 shows that when the resin composition is not added with the crosslinking agent of the disclosure (the silane-modified diallyl bisphenol compound represented by Formula (1)), the dimensional stability and thermal properties thereof are poor. Comparative Example 2 shows that when the cyanate ester resin is not added, the value of CTE is too high and the peeling strength of the copper foil is abnormally reduced. Comparative Example 3 shows that when the cyanate ester resin is added insufficiently, Tg is lower than 200° C. and the value of CTE is negative. Comparative Example 4 shows that when the cyanate ester resin is added excessively, the solder dip test cannot be passed. Comparative Example 5 shows that when the cyanate ester resin and the crosslinking agent of the disclosure (the silane-modified diallyl bisphenol compound represented by Formula (1)) are added excessively, Tg is lower than 200° C. and the value of CTE is negative.

In summary, the thermosetting resin composition of the disclosure includes the maleimide resin, the cyanate ester resin, and the crosslinking agent. The crosslinking agent is the silane-modified diallyl bisphenol compound represented by Formula (1). When the maleimide resin, the cyanate ester resin, and the crosslinking agent in the thermosetting resin composition of the disclosure meet the proposed content ranges (based on the content of the maleimide resin being 100 phr, the content of the cyanate ester resin is 30 phr to 210 phr and the content of the crosslinking agent is 15 phr to 150 phr). By adding the crosslinking agent to increase the resin crosslinking density, the thermosetting resin composition can achieve excellent-dimensional stability, high glass transition temperature (Tg), and high heat resistance, and is applicable to a copper foil substrate and a printed circuit board.

What is claimed is:

1. A thermosetting resin composition, comprising:
   a maleimide resin;
   a cyanate ester resin; and
   a crosslinking agent, wherein the crosslinking agent is a silane-modified diallyl bisphenol compound whose structure is represented by Formula (1):

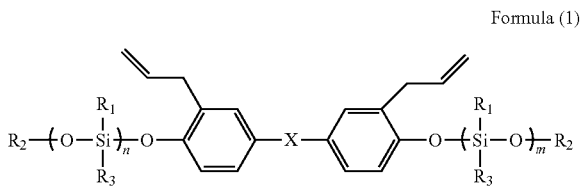

Formula (1)

in Formula (1), X is a linear or branched C1 to C6 alkyl, cycloalkyl, or sulfonyl group, R1 is a linear or branched C1 to C6 alkyl or aryl group, R2 is a C1 to C6 alkyl group, R3 is a functional group having a crosslinkable double bond, and n+m is a positive integer from 1 to 8.

2. The thermosetting resin composition according to claim 1, wherein the functional group having the crosslinkable double bond comprises allyl, vinyl, acrylate, or methacrylate.

3. The thermosetting resin composition according to claim 1, wherein n+m is 2 or 3.

4. The thermosetting resin composition according to claim 1, wherein based on a content of the maleimide resin being 100 phr, a content of the cyanate ester resin is 30 phr to 210 phr and a content of the crosslinking agent is 15 phr to 150 phr.

5. The thermosetting resin composition according to claim 1, wherein an equivalent ratio of reactive groups of the maleimide resin to reactive groups of the cyanate ester resin is 1:1 to 3:1.

6. The thermosetting resin composition according to claim 1, wherein the cyanate ester resin comprises a bisphenol A cyanate ester resin, a dicyclopentadiene (DCPD) cyanate ester resin, a bisphenol F cyanate ester resin, a novolac cyanate ester resin, or a combination thereof.

7. The thermosetting resin composition according to claim 1, wherein the maleimide resin comprises 4,4'-diphenylmethane bismaleimide, phenylmethane maleimide oligomer, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl)hexane, or a combination thereof.

8. A prepreg made of the thermosetting resin composition according to claim 1, wherein the prepreg is made by impregnating or coating a base material with the thermosetting resin composition, and drying the impregnated or coated base material.

9. A prepreg made of the thermosetting resin composition according to claim 2, wherein the prepreg is made by impregnating or coating a base material with the thermosetting resin composition, and drying the impregnated or coated base material.

10. A prepreg made of the thermosetting resin composition according to claim 3, wherein the prepreg is made by impregnating or coating a base material with the thermosetting resin composition, and drying the impregnated or coated base material.

11. A prepreg made of the thermosetting resin composition according to claim 4, wherein the prepreg is made by impregnating or coating a base material with the thermosetting resin composition, and drying the impregnated or coated base material.

12. A prepreg made of the thermosetting resin composition according to claim 5, wherein the prepreg is made by impregnating or coating a base material with the thermosetting resin composition, and drying the impregnated or coated base material.

13. A prepreg made of the thermosetting resin composition according to claim 6, wherein the prepreg is made by impregnating or coating a base material with the thermosetting resin composition, and drying the impregnated or coated base material.

14. A prepreg made of the thermosetting resin composition according to claim 7, wherein the prepreg is made by impregnating or coating a base material with the thermosetting resin composition, and drying the impregnated or coated base material.

* * * * *